(12) United States Patent
Barrow et al.

(10) Patent No.: US 11,443,336 B1
(45) Date of Patent: Sep. 13, 2022

(54) ESTABLISHING INCENTIVES FOR USING A MAPPING APP AND PROVIDING PRACTICE IN USING IT

(71) Applicant: BaseMap, Inc., Bothell, WA (US)

(72) Inventors: Chris Barrow, Bothell, WA (US); Jeffrey Balch, Bothell, WA (US)

(73) Assignee: BaseMap, Inc., Bothell, WA (US)

( * ) Notice: Subject to any disclaimer, the term of this patent is extended or adjusted under 35 U.S.C. 154(b) by 0 days.

(21) Appl. No.: 16/666,167

(22) Filed: Oct. 28, 2019

Related U.S. Application Data

(60) Provisional application No. 62/924,046, filed on Oct. 21, 2019.

(51) Int. Cl.
| | | |
|---|---|---|
| *G06Q 30/02* | (2012.01) | |
| *H04W 4/021* | (2018.01) | |
| *H04W 4/02* | (2018.01) | |

(52) U.S. Cl.
CPC ........ *G06Q 30/0207* (2013.01); *H04W 4/021* (2013.01); *H04W 4/025* (2013.01)

(58) Field of Classification Search
USPC .......................................... 705/14.1, 12, 14
See application file for complete search history.

(56) References Cited

U.S. PATENT DOCUMENTS 9,158,414 B1 * 10/2015 Gluzberg .............. G06F 3/0488

| 2012/0214571 A1* | 8/2012 | Oakes | ..................... G07F 17/32 |
|---|---|---|---|
| | | | 463/17 |
| 2013/0035149 A1* | 2/2013 | Oakes | ................... G07F 17/329 |
| | | | 463/17 |

OTHER PUBLICATIONS

MarkIt: Community Play and Computation to Generate Rich Location Descriptions through a Mobile Phone Game by: Ketan Paten, Mohamed Ismail, Sara Motahari, David Rosenbaum et al ; 2010.*
"HuntWise Adds Significant Brands to Record-Breaking $500,000 Giveaway," retrieved on Jul. 24, 2020 from https://www.ammoland com/2019/11/huntwise-adds-significant-brands-to-record-breaking-500000-giveaway/#axzz6T8164HLw, 5 pages.
HuntWise $500K Hunt Giveaway V-5, Sweepstakes Official Rules, 26 pages.
Lofton, "How to enter Grand Rapids-based hunting app's $520K giveway," retrieved from https://www.mlive.com/news/2019/11/how-to-enter-grand-rapids-based-hunting-apps-520k-giveaway.html, posted Nov. 15, 2019, 4 pages.
"Nation's Leading Hunting App HuntWise Adds Significant Brands to Record-Breaking $500,000 Giveaway," retrieved from https://www.prnewswire.corn/news-releases/nations-leading-hunting-app-humwise-adds-significant-brands-to-record-breaking-500-000-giveaway-300956397.html, posted Nov. 12, 2019, 3 pages.

* cited by examiner

*Primary Examiner* — Victoria E. Frunzi
(74) *Attorney, Agent, or Firm* — Seed IP Law Group LLP

(57) ABSTRACT

A facility is described that causes a map to be displayed to each of a number of users. From each of these users, the facility receives input in connection with the displayed map that selects a geographic location. The facility identifies one of the users who selected a geographic location closest to a target geographic location and causes a prize to be awarded to the identified user.

19 Claims, 27 Drawing Sheets

| marker id | user id | marker number | latitude | longitude | distance | flagged no longer eligible |
|---|---|---|---|---|---|---|
| 68392131 | 111111 | 1 | 46.44875N | 23.14584E | 7387m | |
| 68392988 | 111111 | 2 | 46.42157N | 23.15856E | 5369m | |
| 65045641 | 222222 | 1 | 46.36216N | 23.13988E | 3652m | |
| 68584861 | 333333 | 1 | 46.41654N | 23.13445E | 3783m | | contest marker table

*FIG. 9*

FIG. 17 contest marker table 1700

| marker id | user id | marker number | latitude | longitude | distance | flagged no longer eligible |
|---|---|---|---|---|---|---|
| 68392131 | 111111 | 1 | 46.44875N | 23.14584E | 7387m | |
| 68392988 | 111111 | 2 | 46.42157N | 23.15856E | 5369m | |
| 65045641 | 222222 | 1 | 46.36216N | 23.13988E | 3652m | |
| 68584861 | 333333 | 1 | 46.41654N | 23.13445E | 3783m | |
| 68595326 | 333333 | 2 | 46.38515N | 23.10450E | 435m | |
| 68630023 | 333333 | 3 | 46.4111N | 23.11900E | 2750m | |
| 68647782 | 333333 | 4 | 46.46638N | 23.16000E | 9615m | |
| 68648413 | 333333 | 5 | 46.37986N | 23.16947E | 4693m | |

1711, 1712, 1713, 1714, 1715, 1716, 1717

1701, 1702, 1703, 1704, 1705, 1706, 1707, 1708 contest marker table 2300

| marker id | user id | marker number | latitude | longitude | distance | flagged no longer eligible |
|---|---|---|---|---|---|---|
| 68392131 | 111111 | 1 | 46.44875N | 23.14584E | 7387m | |
| 68392988 | 111111 | 2 | 46.42157N | 23.15856E | 5369m | |
| 65045641 | 222222 | 1 | 46.36216N | 23.13988E | 3652m | |
| 68584861 | 333333 | 1 | 46.41641N | 23.14722E | 4354m | |
| 68595326 | 333333 | 2 | 46.38515N | 23.10450E | 435m | |
| 68630023 | 333333 | 3 | 46.4111N | 23.11900E | 2750m | |
| 68647782 | 333333 | 4 | 46.46638N | 23.16000E | 9615m | |
| 68648413 | 333333 | 5 | 46.37986N | 23.16947E | 4693m | |

FIG. 27 contest marker table (2700)

| marker id | user id | marker number | latitude | longitude | distance | flagged no longer eligible |
|---|---|---|---|---|---|---|
| 68392131 | 111111 | 1 | 46.44875N | 23.14584E | 7387m | |
| 68392988 | 111111 | 2 | 46.42157N | 23.15856E | 5369m | |
| 65045641 | 222222 | 1 | 46.36216N | 23.13988E | 3652m | |
| 68584861 | 333333 | 1 | 46.41641N | 23.14722E | 4354m | yes |
| 68595326 | 333333 | 2 | 46.38515N | 23.10450E | 435m | yes |
| 68630023 | 333333 | 3 | 46.4111N | 23.11900E | 2750m | yes |
| 68647782 | 333333 | 4 | 46.46638N | 23.16000E | 9615m | yes |
| 68648413 | 333333 | 5 | 46.37986N | 23.16947E | 4693m | yes |

2711, 2712, 2713, 2714, 2715, 2716, 2717
2701–2708

ESTABLISHING INCENTIVES FOR USING A MAPPING APP AND PROVIDING PRACTICE IN USING IT

BACKGROUND

Smartphone apps enable users to perform a variety of useful functions using a device that is convenient to keep with them throughout various activities, across a variety of settings.

Mapping smartphone apps permit users to interact with maps. The maps displayed by mapping apps contain a variety of different visual information, including aerial images showing natural and manmade structures and textures, roads, political boundaries, points of interest, etc. It is common for users to be able to "pan" a map—scroll it to show an adjacent area at the same level of magnification—or "zoom" it to increase or decrease the magnification level.

In some mapping apps, a user may pan and/or zoom a map to show a point on the map corresponding to a particular geographic location, and add a "pin" or other location marker to the map to identify that geographic location. For example, a user may place such a marker to identify the destination for a hike, or a point in the hike where the user saw a particular animal.

BRIEF DESCRIPTION OF THE DRAWINGS

FIG. 9 is a table diagram showing sample initial contents of contest marker table used by the facility in some embodiments to represent the guesses made by users in a single contest iteration.

FIG. 17 is a table diagram showing sample contents of a contest marker table after the user has placed five contest markers.

FIG. 23 is a table diagram showing example contents of the contest marker table used by the facility in some embodiments after being updated to reflect a moved contest marker.

FIG. 27 is a table diagram showing sample contents of the contest marker table reflecting the flagging of contest markers placed by a contest-winning user.

DETAILED DESCRIPTION

Figure 1:
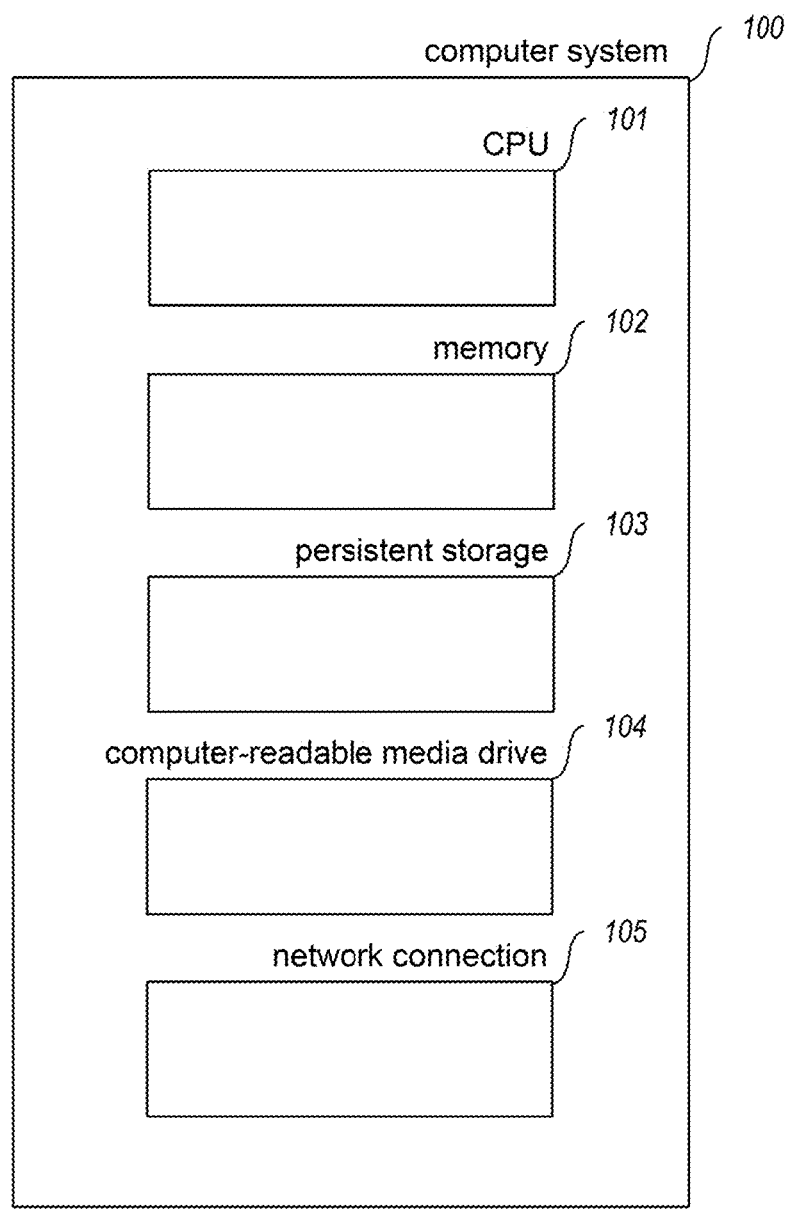
FIG. 1 is a block diagram showing some of the components typically incorporated in at least some of the computer systems and other devices on which the facility operates.

The inventors have recognized that some users don't seek to learn to use mapping apps, or to incorporate their use into appropriate activities, and thus are deprived of their benefits.

In response to this recognition, the inventors have conceived and reduced to practice a software and/or hardware facility that establishes incentives for using a mapping app and provides practice in using it ("the facility"). In particular, the facility operates a contest to identify a secret geographic location using the mapping app. For example, in some embodiments, the facility invites users to use the mapping app to place one or more markers in particular geographic locations as guesses about the secret geographic location, and identifies one or more pieces of outdoor gear or other kinds of prizes that one or more users will win if their guesses are the closest to the secret location when the contest ends.

In some embodiments, the facility provides a boundary that encloses the secret location, and/or other kinds of hints about the secret location. In some embodiments, in order for some of the hints to be useful, users may need to use more specialized features of the mapping app. For example, where the hint specifies an elevation of the secret location, a user may need to turn on and reference and elevation-reporting feature of the mapping app. Where the hint specifies a depth underwater, a user may need to turn on and reference a body-of-water-depth map display layer. Where the hint specifies that the secret location is open for the hunting of a particular type of prey, a user may need to turn on and

REFERENCE

In some embodiments, the facility provides advantages in the contest to users who perform valued activities. These advantages can include, for example: additional guesses; the opportunity to change the location associated with a previous guess; an indication of which of a user's guesses is the closest to or furthest from the secret location; additional hints; enhancement of the prize that the user will win, such as an enhancement that adds an item, upgrades an item, expedites shipping of the prize, etc.

In various embodiments, the activities for which the facility provides advantages include, for example, spending time using the mapping app; performing particular actions using the mapping app; using the mapping app in a particular location, such as in the general vicinity of the secret location; sending invitations to friends to install the mapping app or participate in the contest; rating the mapping app in an app store; using social media to publicize the mapping app or the contest; etc. In some embodiments, the facility provides certain advantages to users based upon their status, such as premium users who pay a greater fee to use the mapping app, users who have entered a certain number of earlier iterations of the contest without winning, users who have recommended the mapping app to more than a threshold number of friends, etc.

By performing in some or all of the ways described above, the facility increases the number of people using the mapping app and the rigor and mastery with which they use it. Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks or additional instances of the same task.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
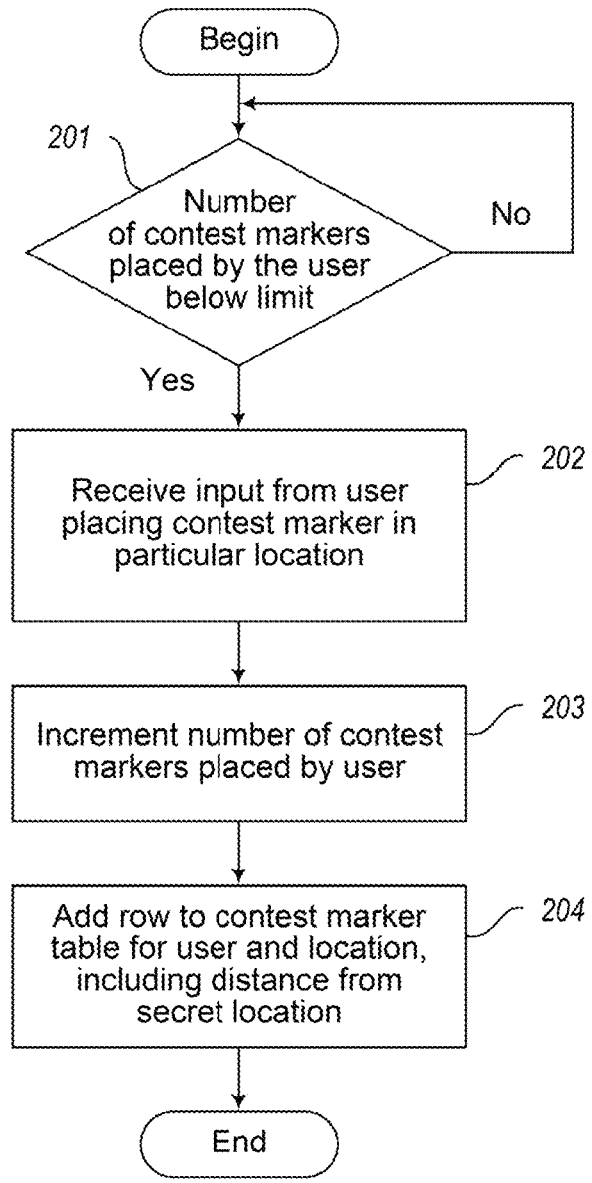
FIG. 2 is a flow diagram showing a process performed by the facility in some embodiments to receive location guesses from a user.

FIG. 2 is a flow diagram showing a process performed by the facility in some embodiments to receive location guesses from a user. In act 201, if the number of contest markers placed by the user is below a limit, then the facility continues in act 202, else the facility continues in act 201. In some embodiments, each user has the same limit. In some embodiments, users can increase their limit by taking particular actions and/or by having certain user statuses.

In act 202, the facility receives input from the user placing a contest marker in a particular geographic location.

Figure 3:
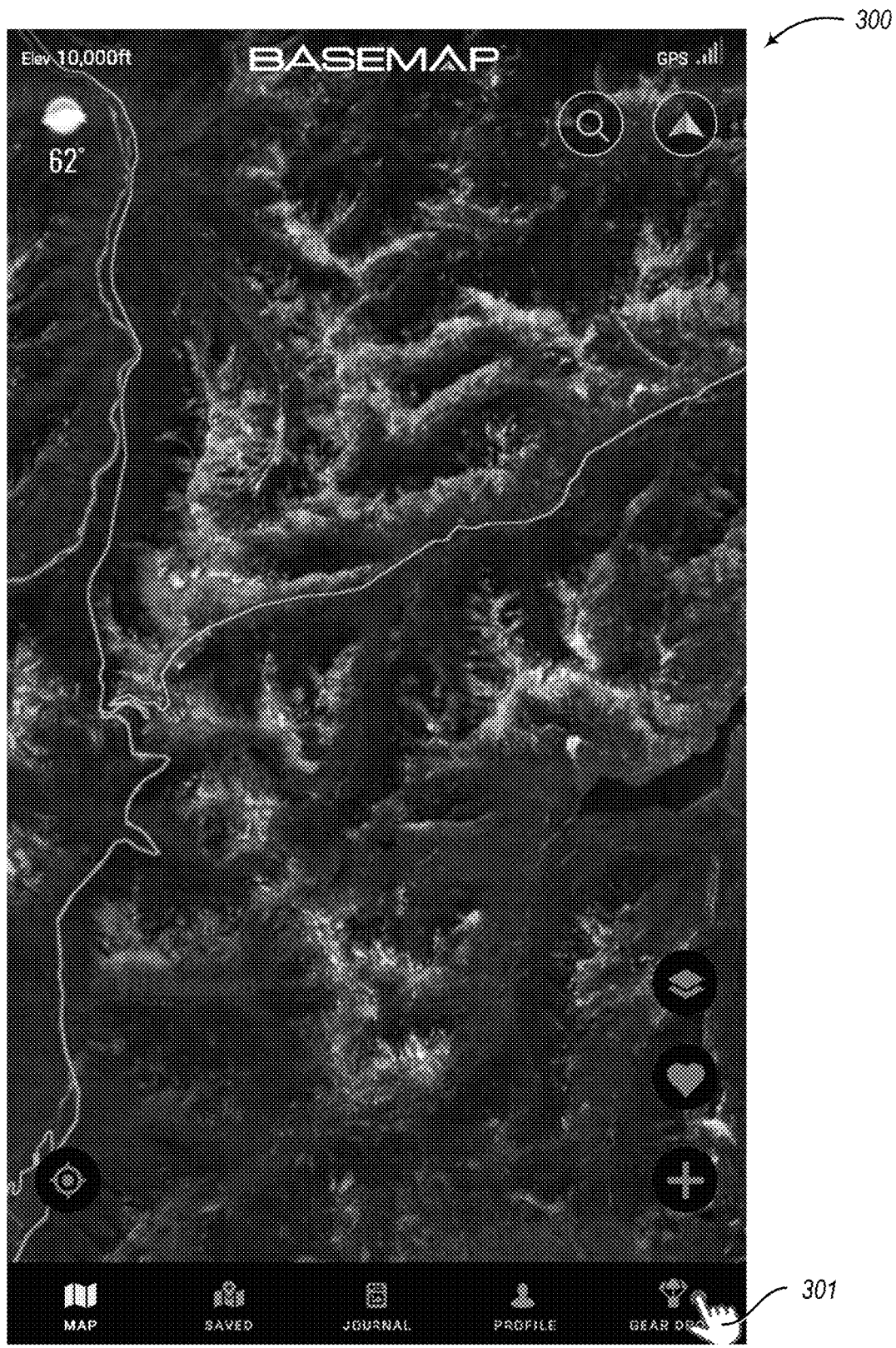
FIGS. 3-8 are display diagrams showing sample displays presented by the facility in some embodiments to receive user input placing a contest marker.

FIGS. 3-8 are display diagrams showing sample displays presented by the facility in some embodiments to receive user input placing a contest marker. FIG. 3 shows an initial display of a map. In addition to areal geographic imagery and river traces, the display 300 includes a contest control 301 that the user can activate, such as by touching it, to participate in the contest.

Figure 4:
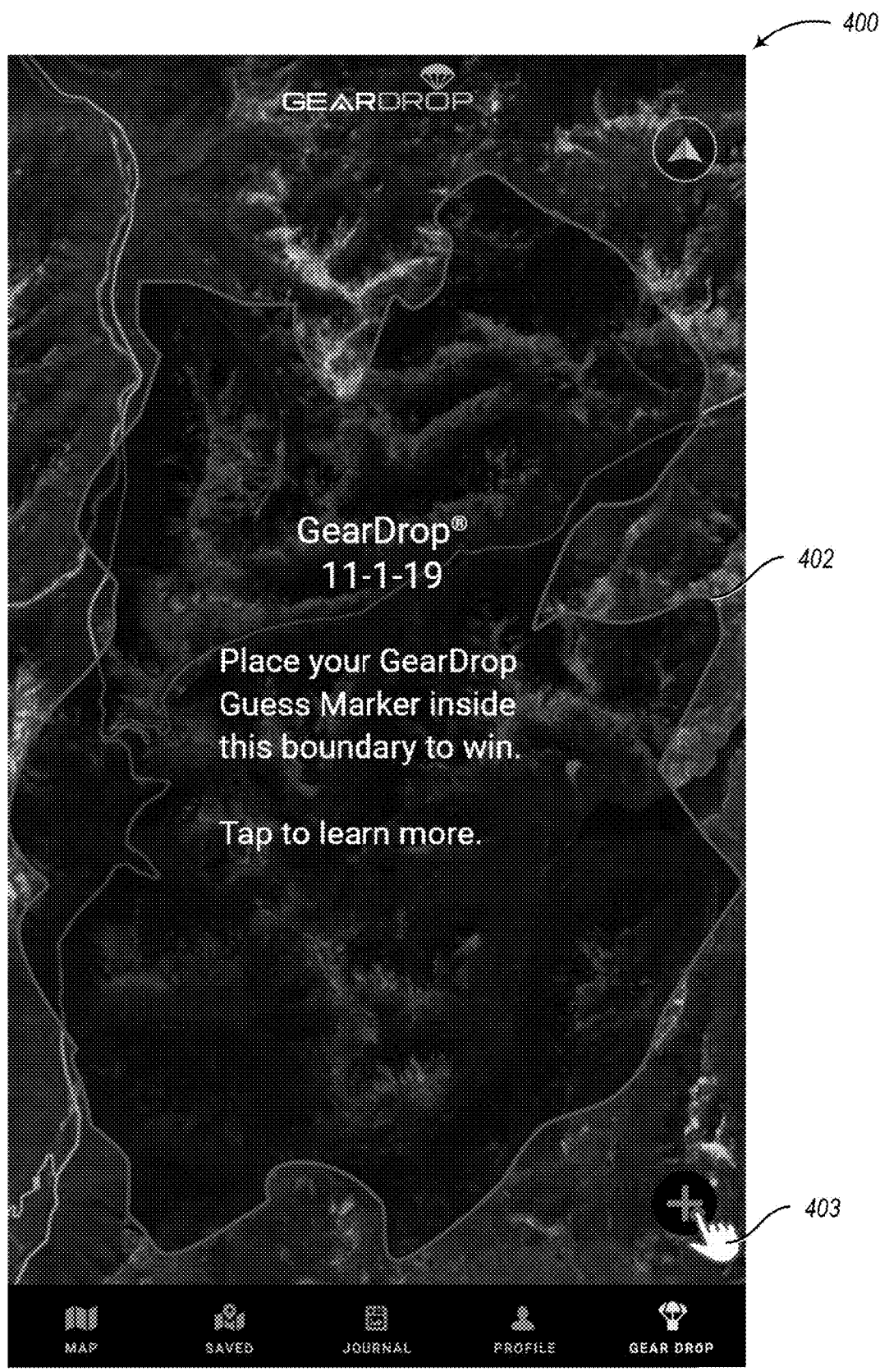

FIG. 4 shows an introductory contest display. This display 400 shows the border of a geographic region 402 that contains the secret location for the contest. It further displays the date on which the contest ends, and an invitation to "place your GearDrop guest marker inside this boundary to win." The user can touch this invitation to obtain additional details about the contest. The display also includes a marker-adding control 403 that the user can activate in order to add a contest marker.

Figure 5:
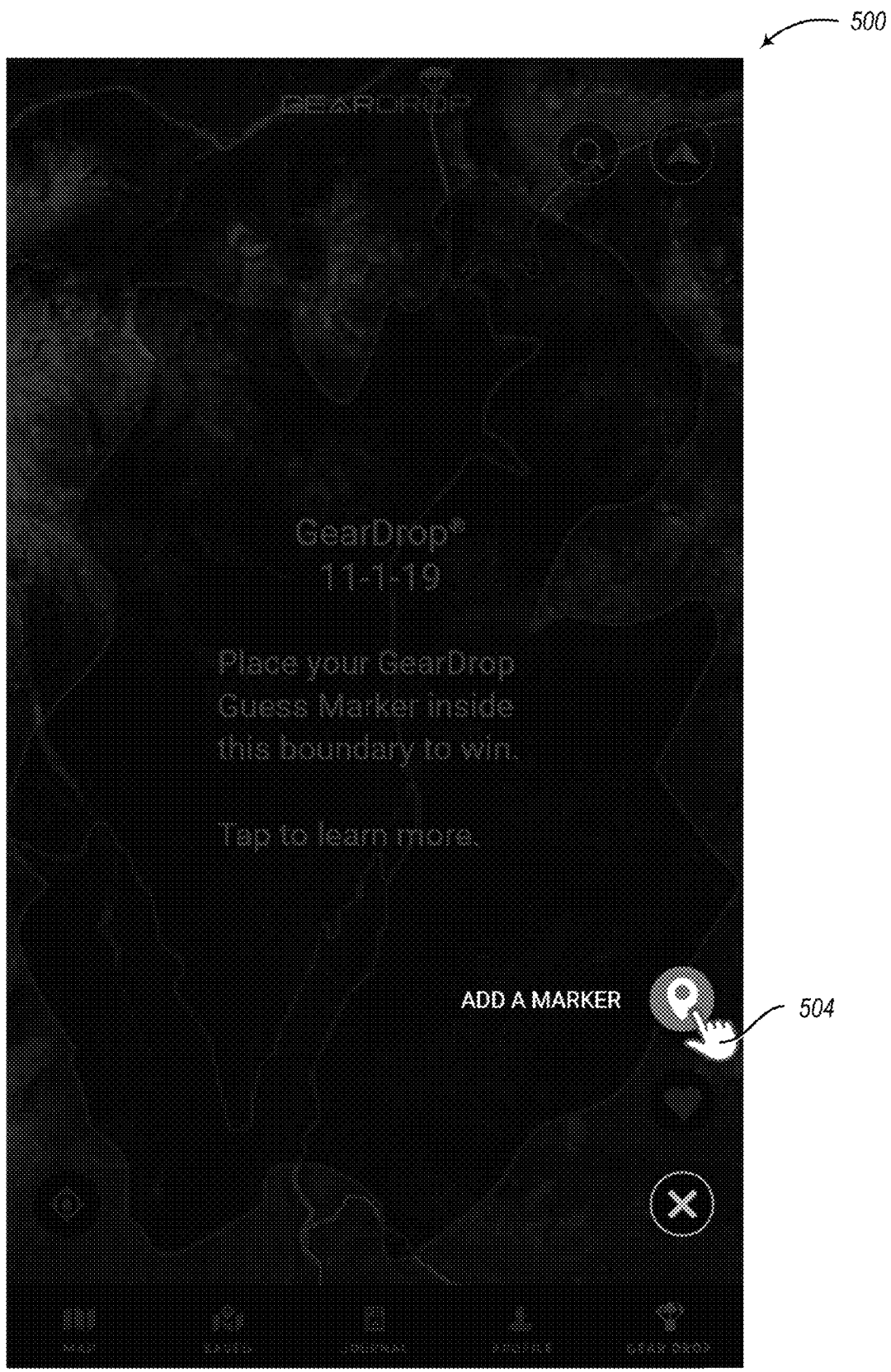

FIG. 5 shows an interim screen. This display 500 includes a control 504 for adding a marker that the user may touch to continue.

Figure 6:
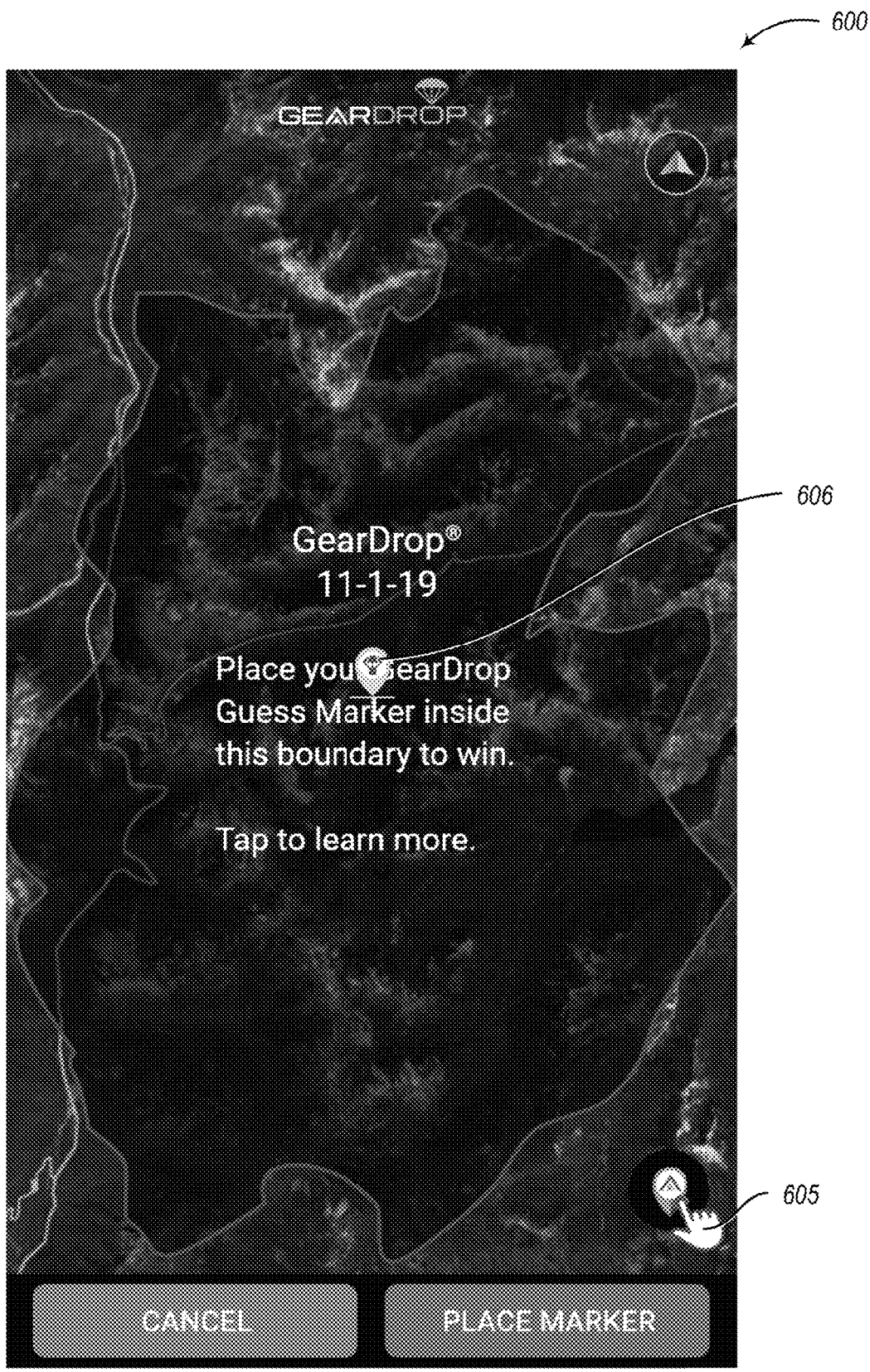

FIG. 6 shows a marker placement display. In the center of the display 600 is a contest marker in an initial location. The user can change the location indicated by this contest marker by panning and/or zooming the map. In some embodiments, to pan the map, the user slides one or more fingers all in a single direction, thus shifting the map contents in that direction. In some embodiments, the user can zoom the map in by moving two fingers away from one another, or zoom out by moving two fingers closer together. After the user has adjusted the map to place the location they wish to guess under the contest marker, the user activates a contest marker placement control 605.

Figure 7:

FIG. 7 shows a guess menu display. This display 700 shows a set 707 of different location guesses available to the user, and further shows the user selection 708 of "guess 1" for the location selected in FIG. 6.

Figure 8:
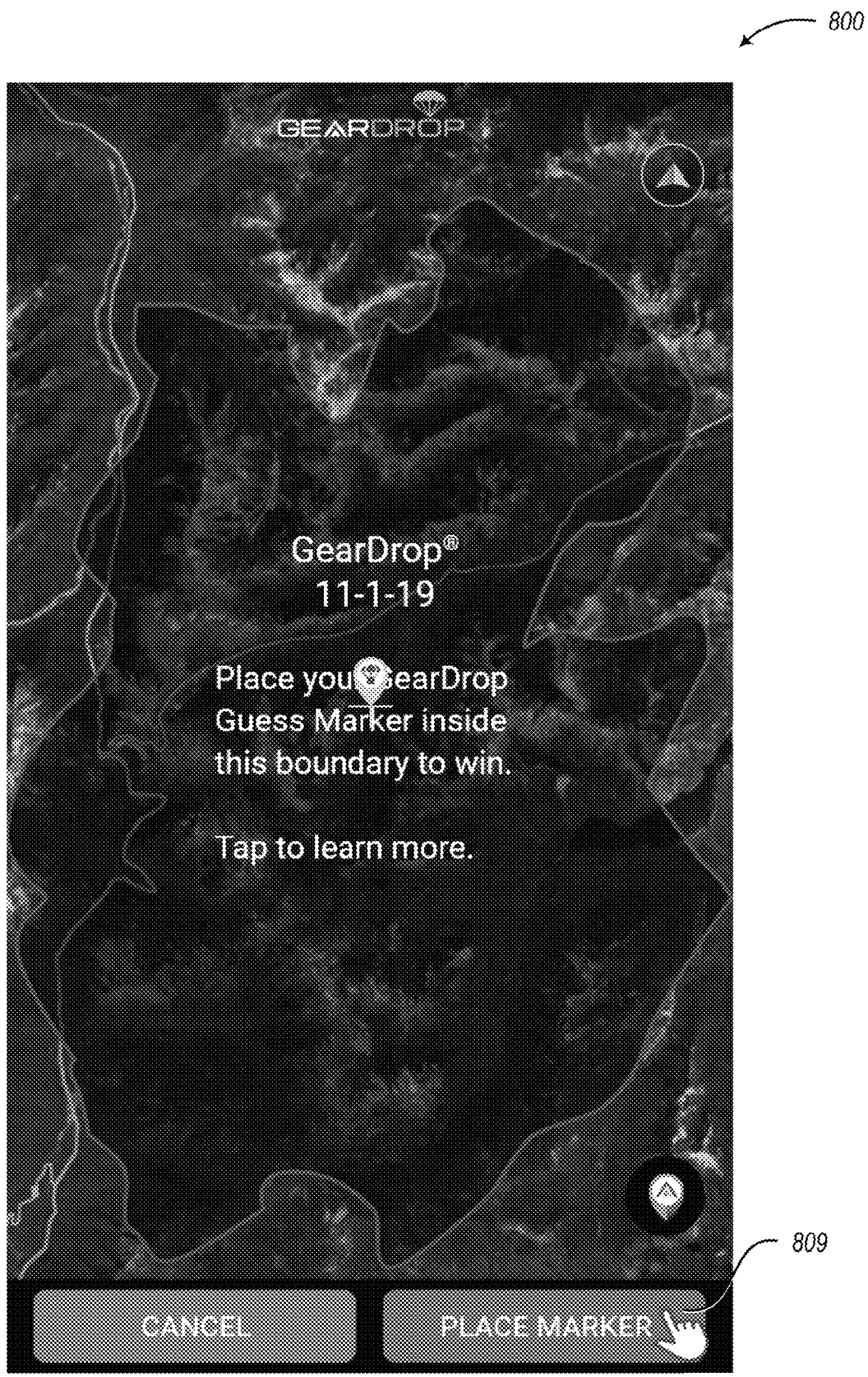

FIG. 8 shows the next step after selecting a particular guess for the marker location. This display 800 contains a place marker control 809 that the user can activate to finalize the guess he or she selected with the location he or she selected.

Returning to FIG. 2, in act 203, the facility increments a number of contest markers placed by the user. In some embodiments (not shown), the facility maintains contest guess that is identified by a different explicit counter for each user. In some embodiments, the facility represents this information by the number of rows contained by a contest marker table discussed below that identify each user.

In act 204, the facility adds a row to the contest marker table for the user and the location selected in act 202, including in that added row the distance between the marker location and the secret location.

FIG. 9 is a table diagram showing sample initial contents of contest marker table used by the facility in some embodiments to represent the guesses made by users in a single contest iteration. The contest marker table 900 is made up of rows, such as rows 901-904, each corresponding to a different combination of user identifier and marker number. For example, row 901 corresponds to the combination of user identifier 111111 and marker number 1; row 902 corresponds to the combination of the same user ID and marker number 2; and row 903 corresponds to the combination of user ID 222222 and marker number 1. Each row is divided in to the following columns: a marker ID column 911 uniquely identifying the row of the table; a user ID column 912 identifying the user who placed the marker to which the row corresponds; a marker number column 913 that distinguishes multiple markers placed by the same user from one another; a latitude column 914 and a longitude column 915 that together identify the location of the marker; a distance column 916 that indicates the distance between the marker and the secret location; and a flagged no longer eligible column 917 that can be set to yes to cause the facility to ignore the row for purposes of selecting contest winners, as is discussed further below. For example, row 904 indicates that the marker having marker ID 68584861 was placed by the user having using ID 333333; is this user's first marker; was placed at location 46.41654N, 23.13445E, which is 3783 meters from the secret location, and this guess is still eligible to still win the contest.

Figure 10:
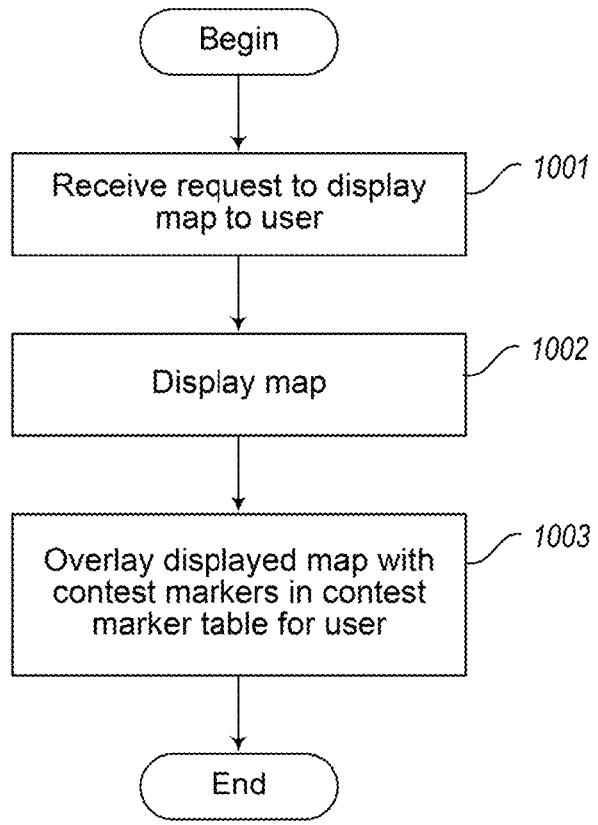
FIG. 10 is a flow diagram showing a process performed by the facility in some embodiments to display a particular user's contest markers.

Returning to FIG. 2, after act 204, the shown process completes. FIG. 10 is a flow diagram showing a process performed by the facility in some embodiments to display a particular user's contest markers. In act 901, the facility receives a request to display a map to the user. In act 902, the facility displays the map. In act 903, the facility overlays the map displayed in act 902 with any contest markers listed for the user in the contest marker table. After act 903, this process concludes by the facility in some embodiments.

Figure 11:
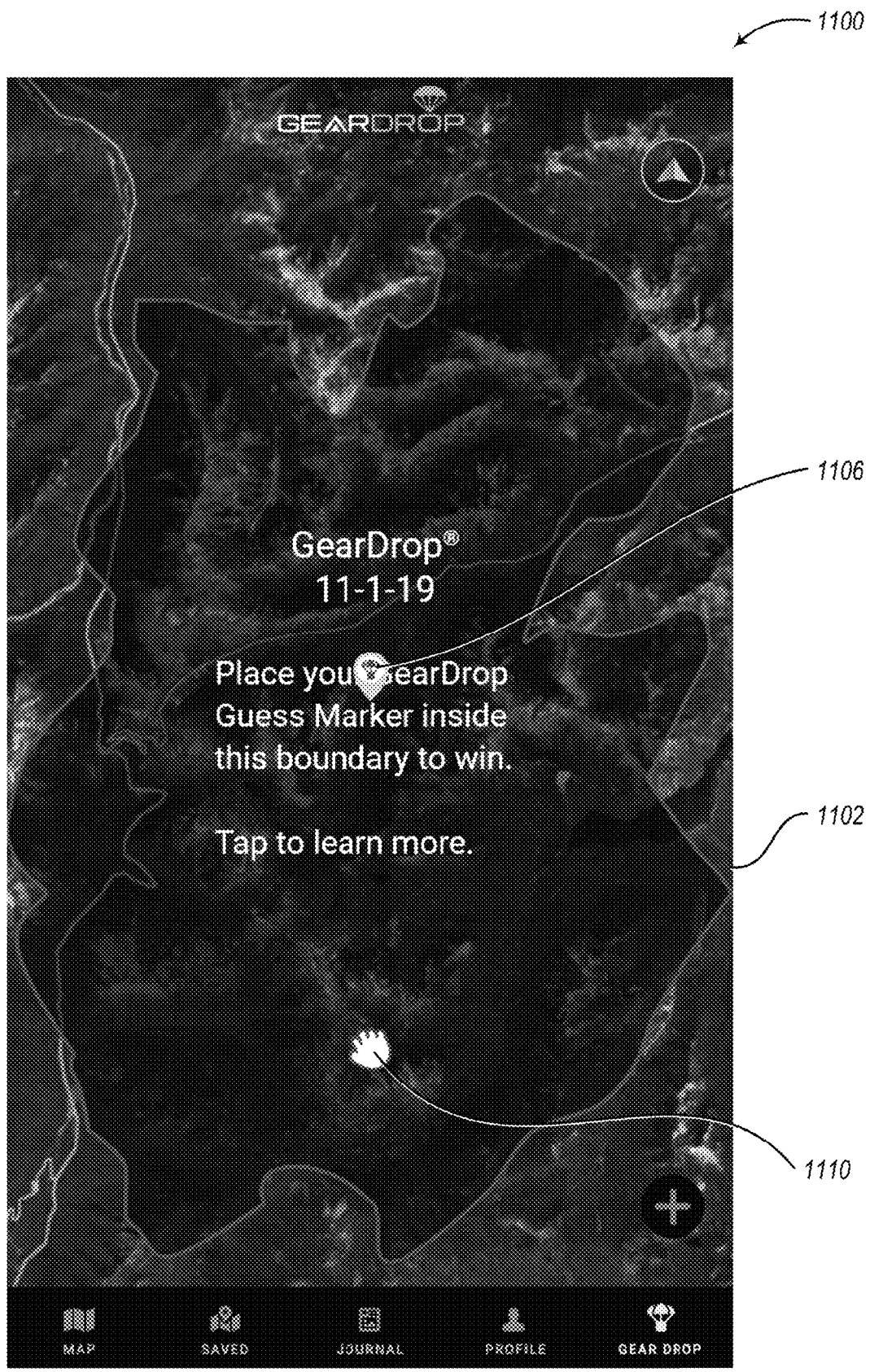
FIGS. 11-16 are display diagrams showing sample displays presented by the facility in some embodiments that show the display of the user's first marker, and the user's placement of his or her second marker.

FIGS. 11-16 are display diagrams showing sample displays presented by the facility in some embodiments that show the display of the user's first marker, and the user's placement of his or her second marker. FIG. 11 shows the user's first gear marker 1106, as well as a hand icon 1110 indicating that the map may be panned and/or zoomed to select a new location.

Figure 12:
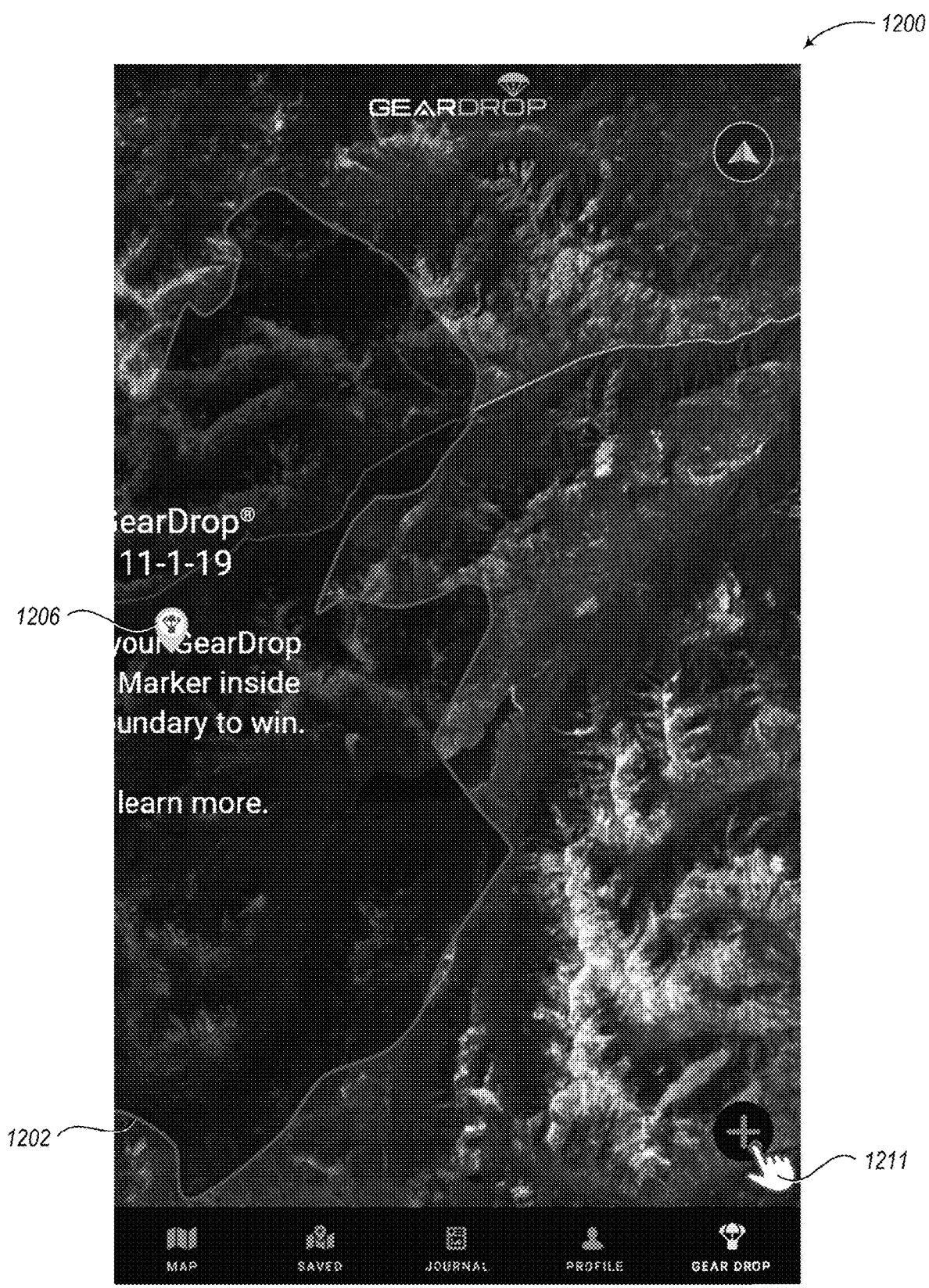
Figure 13:
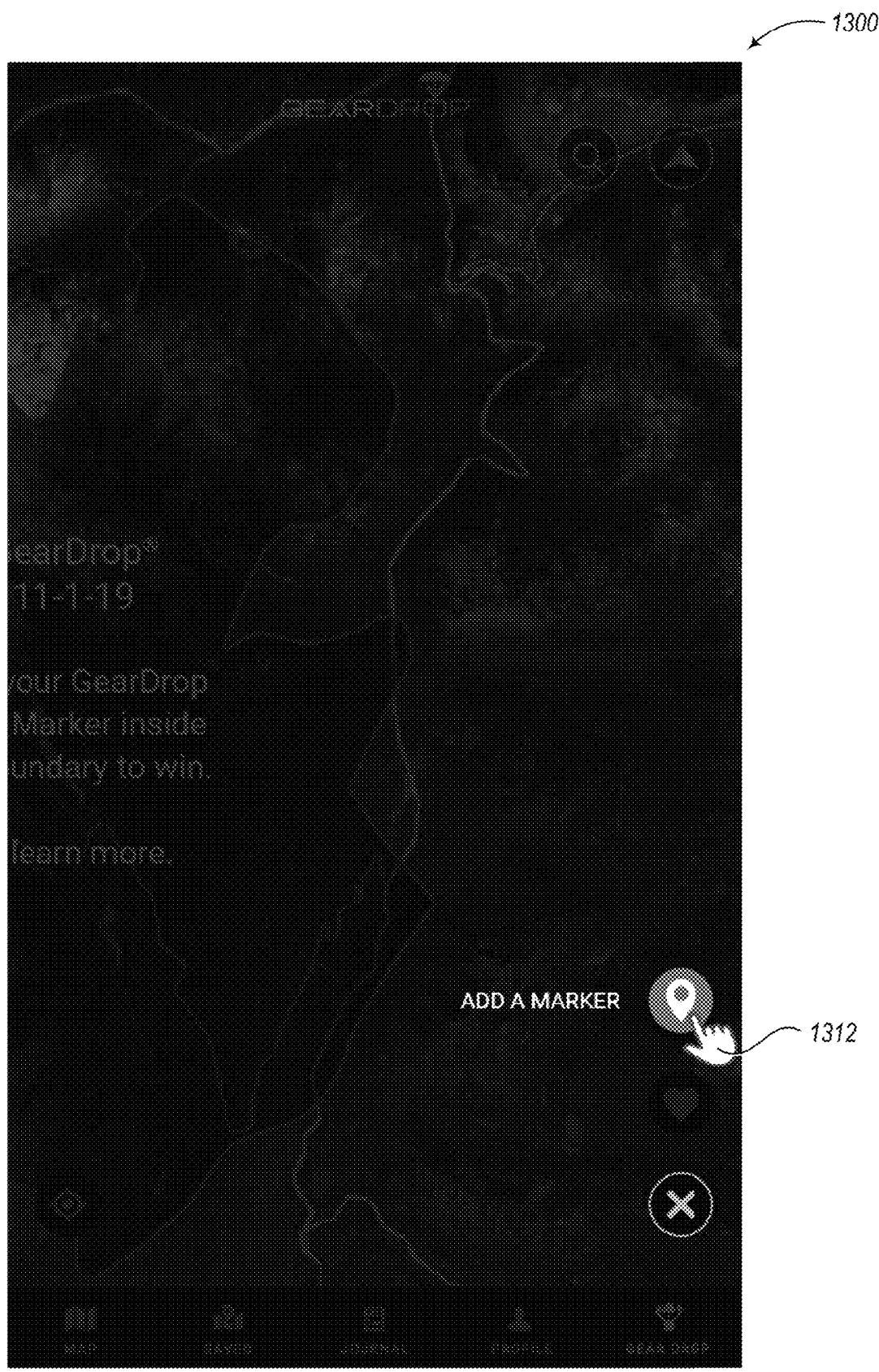
Figure 14:
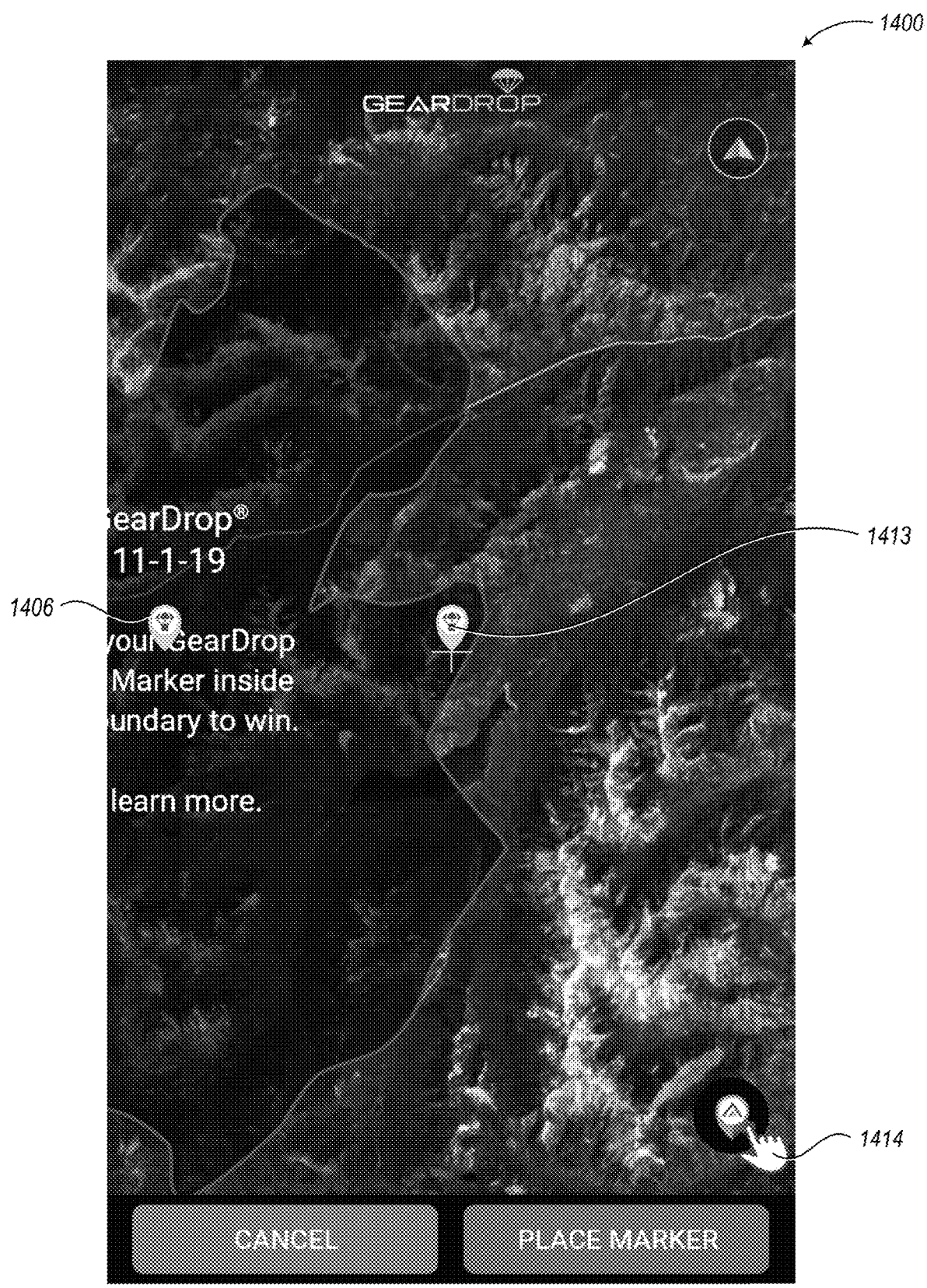
Figure 15:
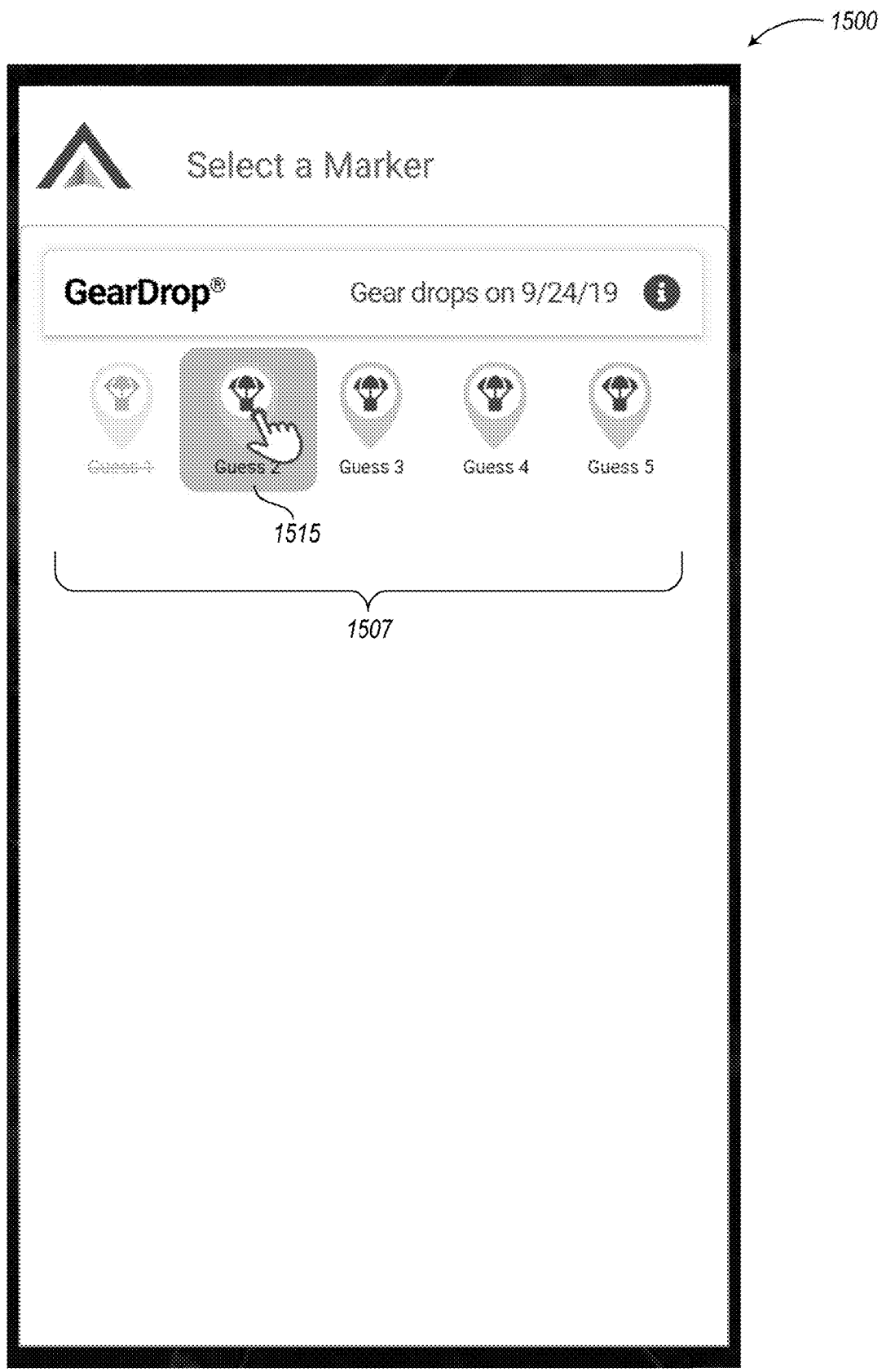
Figure 16:
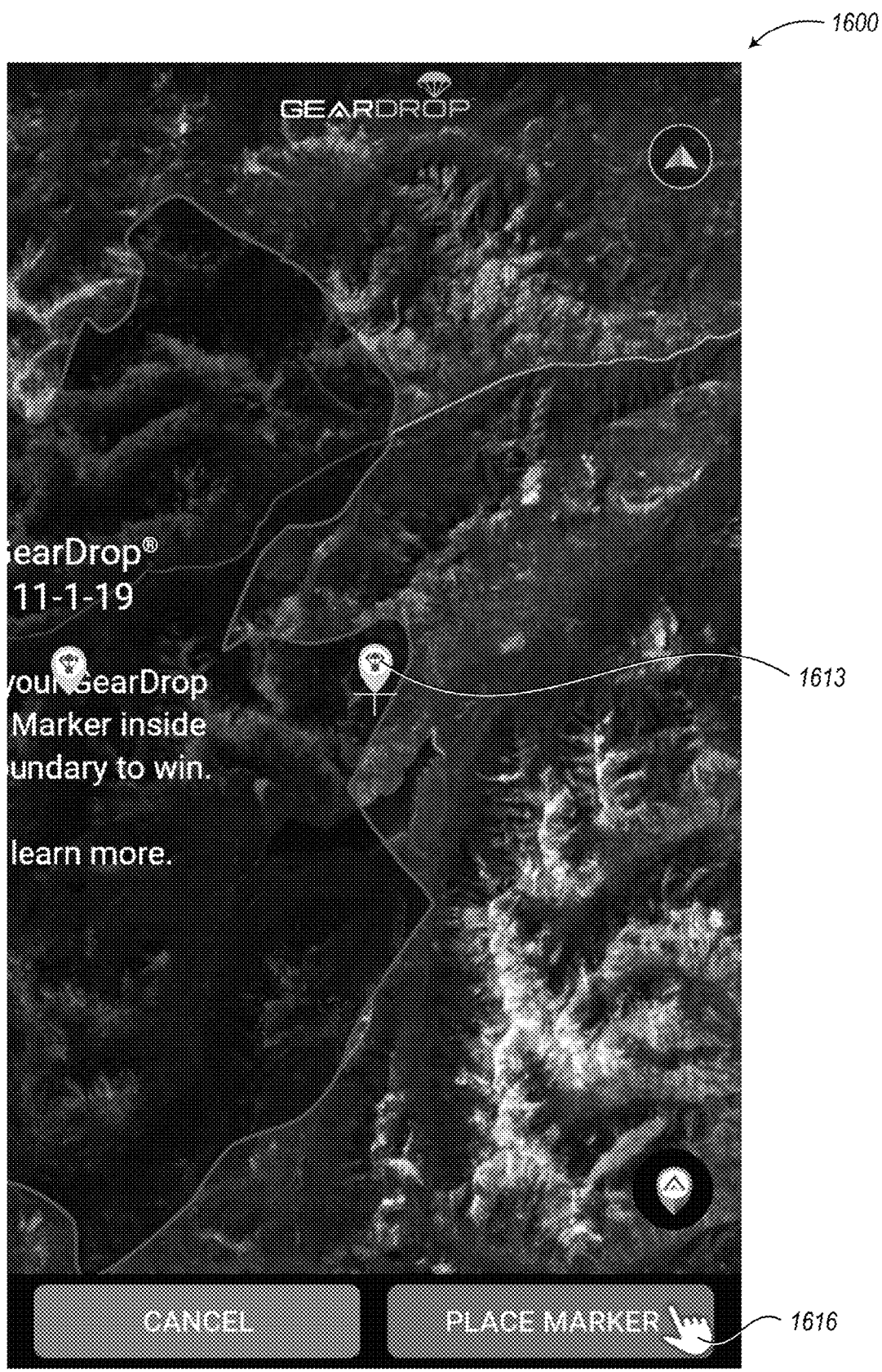

Relative to FIG. 11, FIG. 12 shows the panning of the map to the east—it can be seen that the first contest marker 1206 has moved leftward from the center of the map. The user can select marker-addition tool 1211 to add a new marker that can be used as a contest marker.

FIGS. 13-16 mirror FIGS. 5-8 for placing the user's second contest marker. After FIG. 16, the user has two contest markers. The user goes on to place three more contest markers, for a total of five, which is equal to this user's contest marker limit.

FIG. 17 is a table diagram showing sample contents of a contest marker table after the user has placed five contest markers. It can be seen that table 1700 now has five rows 1704-1708 representing contest guesses made by the user having user ID 333333.

In some embodiments, if the user attempts to place an additional contest marker that would cause them to exceed their contest marker limit, the facility displays a message indicating this.

Figure 18:
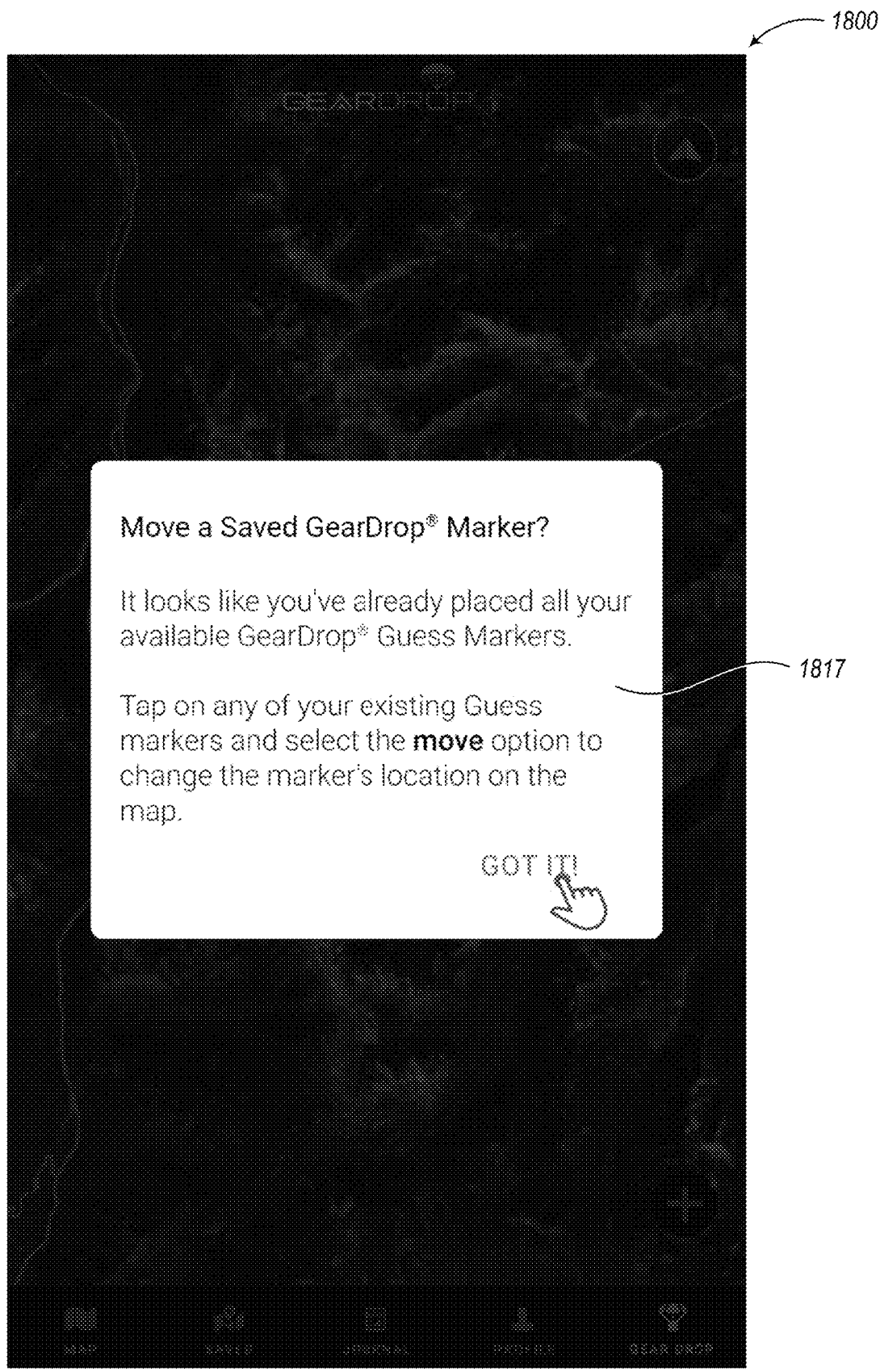
FIG. 18 is a display diagram showing a sample display presented by the facility in some embodiments to indicate that the user has exhausted their contest guesses.

FIG. 18 is a display diagram showing a sample display presented by the facility in some embodiments to indicate that the user has exhausted their contest guesses. The display 1800 includes a message 1817 that communicates this fact, and invites the user to move one of their existing contest markers to a new location. After reading this message, the user can dismiss it.

Figure 19:
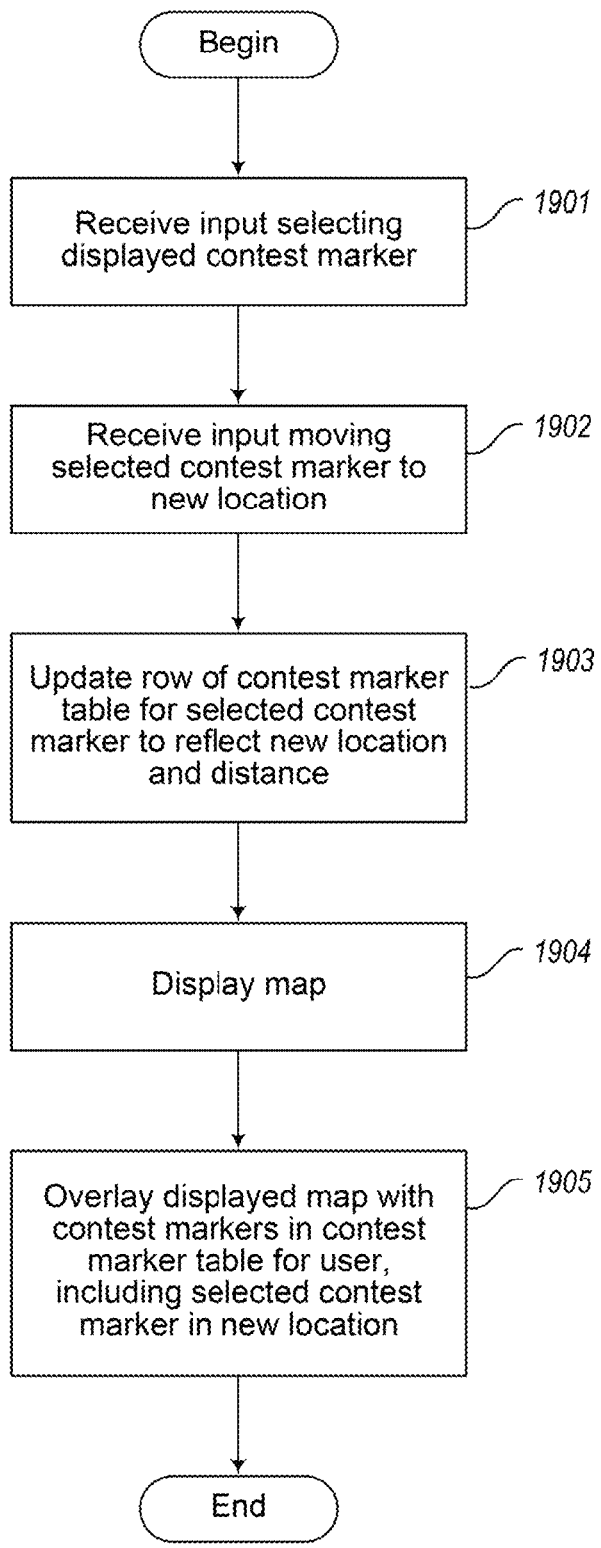
FIG. 19 is a flow diagram showing a process performed by the facility in some embodiments to move an existing contest marker.

FIG. 19 is a flow diagram showing a process performed by the facility in some embodiments to move an existing contest marker. In act 1901, the facility receives input selecting a displayed contest marker.

Figure 20:
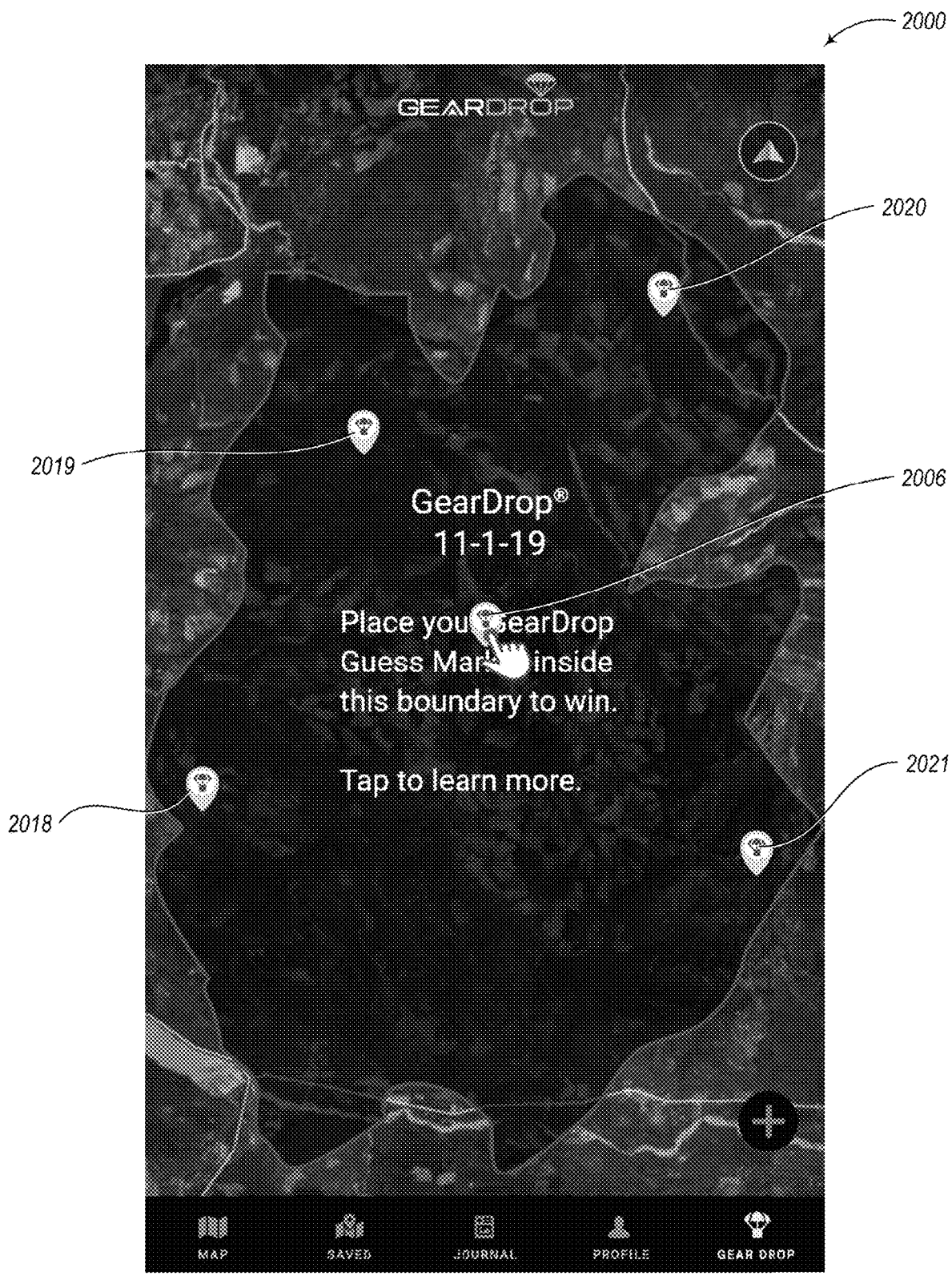
FIGS. 20-21 are display diagrams showing sample displays presented by the facility in some embodiments to enable the selection of one of the user's displayed contest markers.
Figure 21:
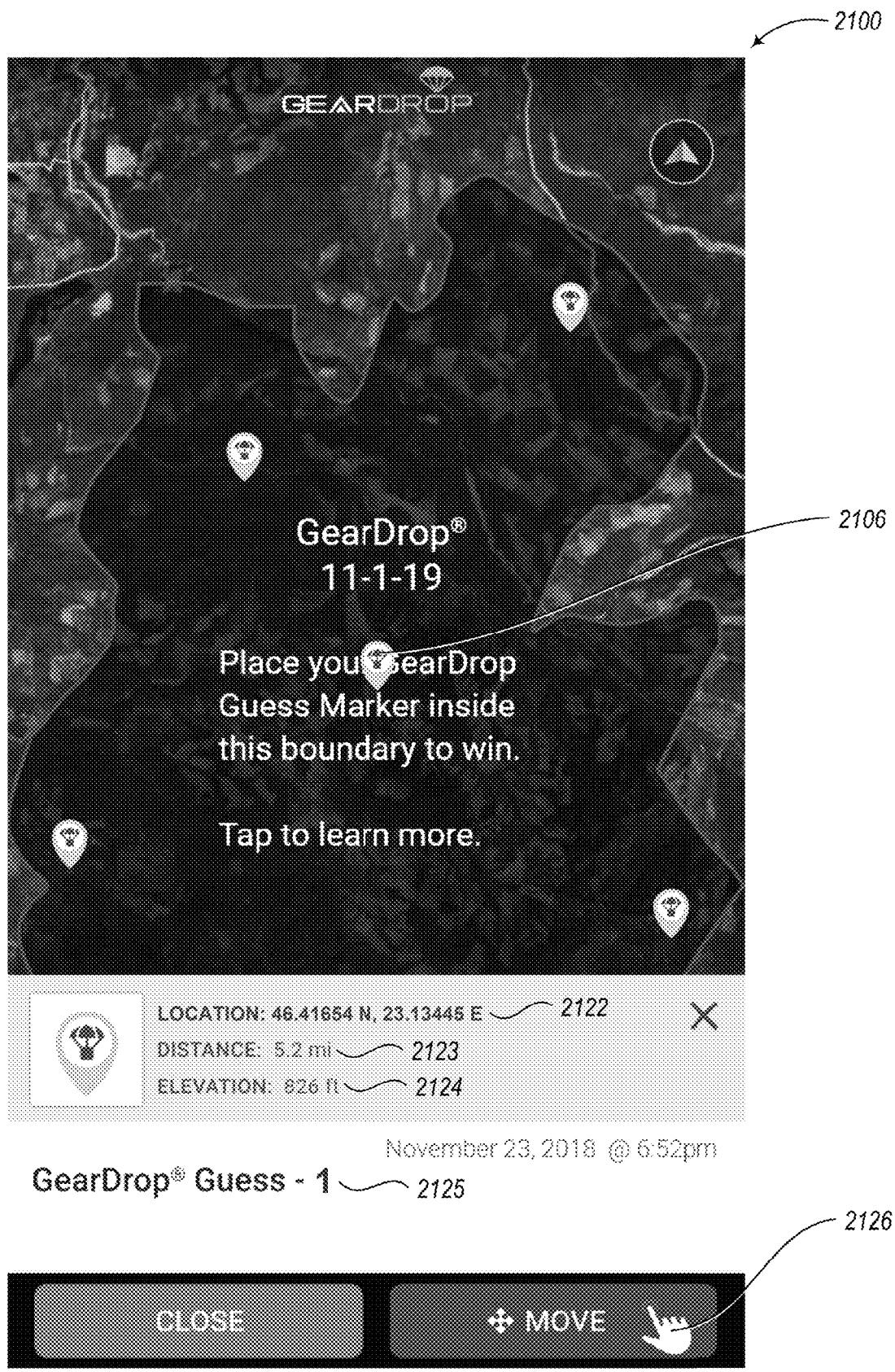

FIGS. 20-21 are display diagrams showing sample displays presented by the facility in some embodiments to enable the selection of one of the user's displayed contest markers. FIG. 20 shows the user's five contest markers 2006, 2018, 2019, 2020, and 2021. It further shows the user selecting contest marker 2006.

FIG. 21 shows the result of selecting contest marker 2006. The facility displays information about the selected contest marker, such as its guess number 2125, its location 2122, its distance 2123 from the current center of the map, and its elevation 2124. The user can select control 2126 in order to move this guess number 1 contest marker.

Returning to FIG. 19, in act 1902, the facility receives input moving the contest marker selected in 1901 to a new location.

Figure 22:
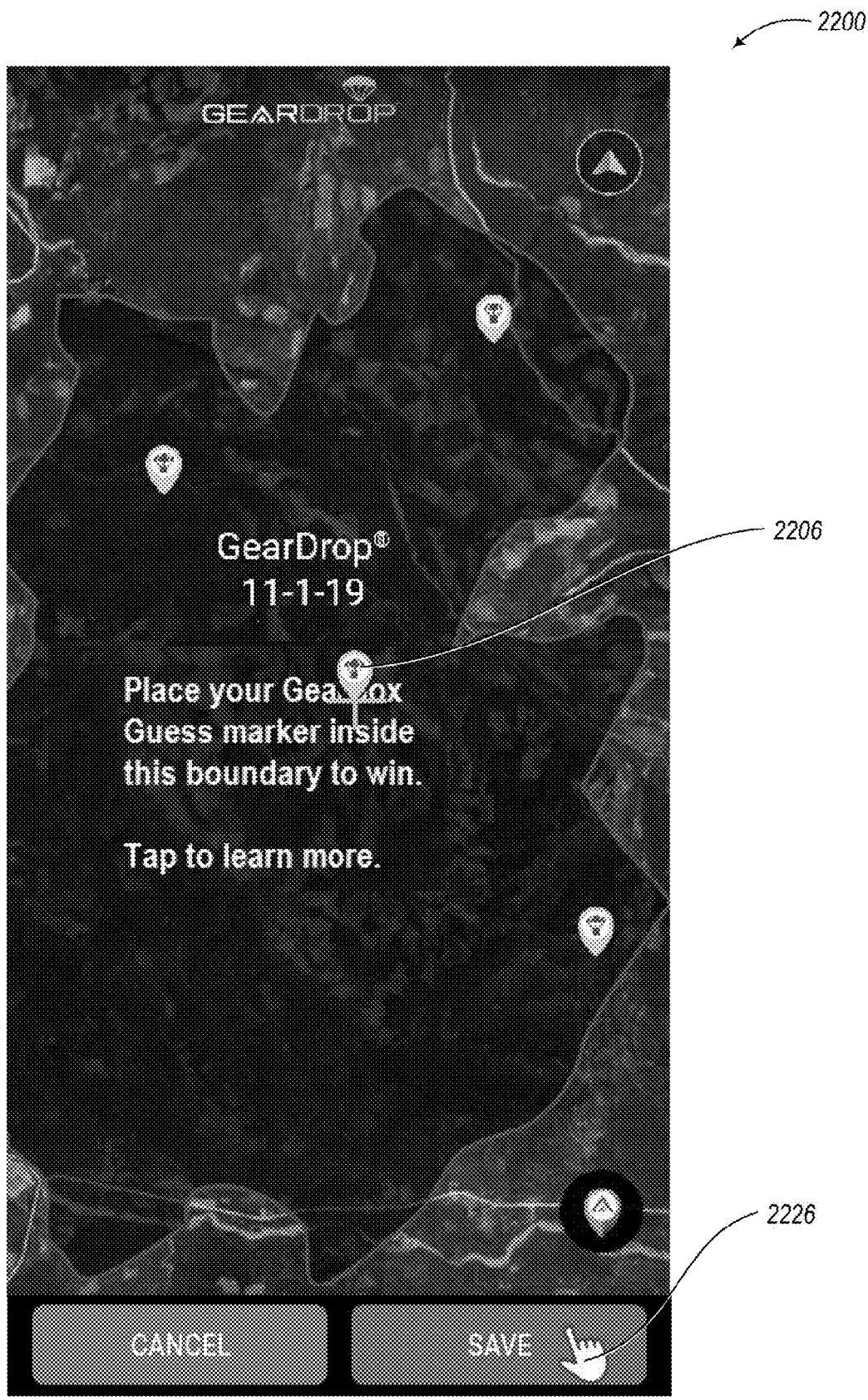
FIG. 22 is a display diagram showing a sample display presented by the facility in some embodiments, in which the user moves a selected contest marker to a new location.

FIG. 22 is a display diagram showing a sample display presented by the facility in some embodiments, in which the user moves a selected contest marker to a new location. FIG. 22 shows the panning of the map to the east, with the map contents shifting left in the frame. After doing so, the user selects control 2227 in order to save the new location.

Returning to FIG. 19, in act 1903, the facility updates the row of the contest marker table for the contest marker selected in act 1901 to reflect the new location selected in act 1902, and the new distance from the secret location.

FIG. 23 is a table diagram showing sample contents of the contest marker table used by the facility in some embodiments after being updated to reflect a moved contest marker. In particular, by comparing row 2304 shown in FIG. 23 to row 1704 shown in FIG. 17, it can be seen that the corresponding contest marker has been moved from the location 46.416.54N, 23.13445E to location 46.41641N, 23.14722E.

Returning to FIG. 19, in act 1904, the facility displays the map. In act 1905, the facility overlays the map displayed in act 1904 with contest markers in the contest marker table for the user, including the contest marker selected in act 1901, in the new location specified for it in act 1903. In terms of the example shown in FIG. 23, the facility overlays the displayed map with five contest markers in accordance with rows 2304-2308 of contest marker table 2300. After act 1905, this process concludes.

Figure 24:
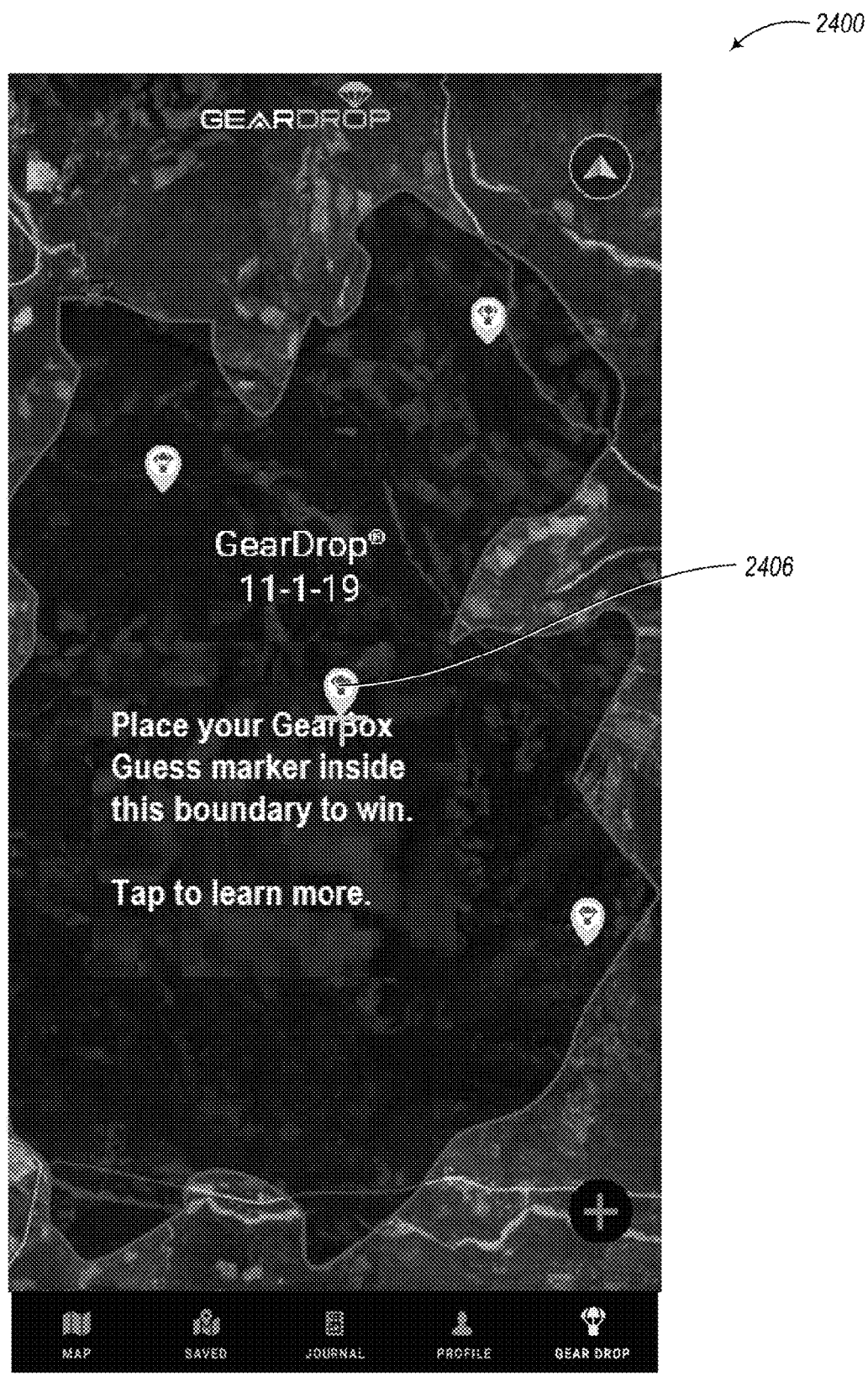
FIG. 24 is a display diagram showing a sample display presented by the facility in some embodiments to show the user's guess 1 contest marker moved to the east in accordance with the user's actions.

FIG. 24 is a display diagram showing a sample display presented by the facility in some embodiments to show the user's guess 1 contest marker moved to the east in accordance with the user's actions. By comparing contest marker 2406 shown in FIG. 24 with contest marker 2106 shown in FIG. 21, this movement of the contest marker can be discerned.

Figure 25:
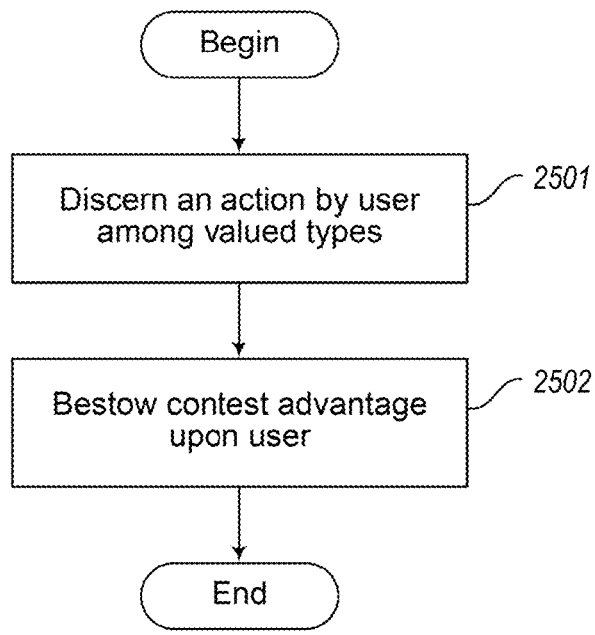
FIG. 25 is a flow diagram showing a process performed by the facility in some embodiments to reward valuable actions by a user.

FIG. 25 is a flow diagram showing a process performed by the facility in some embodiments to reward valuable actions by a user. In act 2501, the facility discerns an action by a user that is among one or more valued action types. Examples of such valued action types are provided above. In act 2502, the facility responds to discerning the action in act 2501 by bestowing upon this user an advantage in the contest. Examples of different types of advantages bestowed by the facility in various embodiments appear above. After act 2502, this process concludes.

Figure 26:
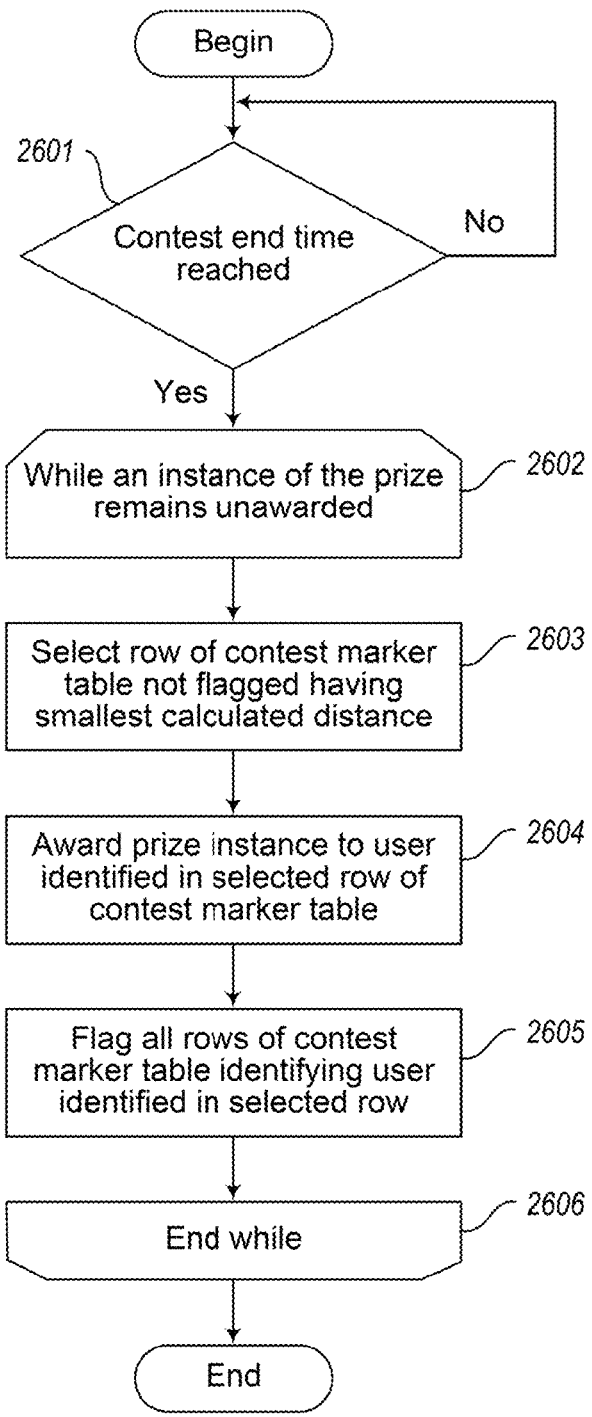
FIG. 26 is a flow diagram showing a process performed by the facility in some embodiments to complete a contest instance.

FIG. 26 is a flow diagram showing a process performed by the facility in some embodiments to complete a contest instance. In act 2601, if the ending time for the contest has been reached, then the facility continues in act 2602, else the facility continues in act 2601. In acts 2602-2606, the facility loops through acts 2603-2605 while at least one instance of the contest's prize remains to be awarded. In act 2603, the facility selects, among rows of the contest marker table that are not flagged, the row having the smallest calculated distance. With reference to the example shown in FIG. 23, in act 2603, the facility searches unflagged rows 2301-2308 for the row having the smallest distance. In doing so, the facility selects row 2305, which has the smallest distance among these rows, 435 meters.

In act 2604, the facility awards a prize instance to the user identified in the row of the contest marker table selected in act 2603. In the example, this is the user having user ID 333333. In act 2605, the facility flags all rows of the contest marker table that identify the user who was identified in the selected row. In terms of the example, the facility in act 2605 flags rows 2304-2308, each of which contains the user ID 333333.

FIG. 27 is a table diagram showing sample contents of the contest marker table reflecting the flagging of contest markers placed by a contest-winning user. In particular, by comparing rows 2704-2708 of contest marker table 2700 shown in FIG. 27 to rows 2304-2308 of contest marker table 2300 shown in FIG. 23, it can be seen that rows 2704-2708 each containing the user ID 333333 have been flagged.

Returning to FIG. 26, in act 2606, if at least one instance of the prize remains unawarded, then the facility continues in act 2602, else this process concludes.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computing system including a mapping application, the computing device having a display device the method comprising:
   for each user of a plurality of users:
      causing a map representing a geographic region to be displayed in connection with the mapping application on the display device;
      causing a marker-adding control to be presented to the user on the display device;
      receiving user input reflecting activation of the presented marker-adding control;
      after receiving the user input reflecting activation of the presented marker-adding control, receiving user input reflecting a touch at a point on the displayed map within the geographic region;
      in response to receiving user input reflecting a touch at a point on the displayed map, causing a marker to be added to the displayed map at the point; and
      determining a selected geographic location that the point on the displayed map represents;
      selecting the determined geographic location on behalf of the user;
   accessing a particular set of one or more actions, wherein the set of one or more actions includes exercising a particular feature of the mapping application;
   determining whether a particular user has taken an action among the set of one or more actions;
   in response to the determining, permitting the particular user to select an additional geographic location within the geographic region;
   identifying a user among the plurality of users who selected a geographic location closest to a target geographic location; and
   causing a prize to be awarded to the identified user.

2. The method of claim 1, further comprising:
   for each of the plurality of users:
      causing a visual indication of a geographic region containing the target geographic location to be displayed together with the map.

3. The method of claim 1, further comprising:
   for each of the plurality of users:
      causing a hint about the target geographic location to be presented to the user.

4. The method of claim 3 wherein the presented hint is a textual hint.

5. The method of claim 3 wherein the presented hint is a video hint.

6. The method of claim 3 wherein causing the map to be displayed in receiving user input is performed via a mapping app,
   and wherein information value of the presented hint is accessible via a distinguished feature of the mapping app.

7. The method of claim 1, further comprising:
   determining that a particular user among the plurality of users has taken an action among a particular set of one or more actions; and
   in response to the determining, presenting an additional hint to the particular user.

8. The method of claim 1, further comprising:
   determining that a particular user among the plurality of users has taken an action among a particular set of one or more actions; and
   in response to the determining, causing the prize to be enhanced if it is awarded to the particular user.

9. The method of claim 1, wherein identifying the user among the plurality of users who selected a geographic location closest to a target geographic location comprises:
   updating a table of geographic locations with a plurality of geographic locations selected by the plurality of users; and
   selecting the identified user based on the table of geographic locations.

10. One or more hardware storage devices collectively storing a geodata data structure, for use in connection with a mapping application, the data structure comprising:
    a plurality of entries, each entry comprising:
       information identifying a person;
       information indicating the person has taken an action among a particular set of one or more actions, wherein the set of one or more actions includes exercising a particular feature of the mapping application; and
       information identifying a geographic position selected by the person, the information identifying the geographic position being received as user input reflecting a touch at a point on a displayed map in connection with activation of a marker-adding control, the displayed map being displayed on a display device and representing a geographic region, such that contents of the data structure are usable to determine a person who selected a geographic position nearest a target geographic position,
    such that the contents of the data structure are usable to determine that the person is able to select a second geographic position.

11. The one or more hardware storage devices of claim 10 wherein each entry further comprises:
    a distance from the target geographic position of the geographic position identified by the entry.

12. The one or more hardware storage devices of claim 10 wherein each entry further comprises:
    an indication about whether the entry is eligible as a basis for determining that the person it identifies selected a geographic position nearest a target geographic position.

13. The one or more hardware storage devices of claim 10, wherein the geodata data structure further comprises:
    a table of entries, the table of entries including at least one entry of the plurality of entries, such that the table of entries is usable to select the identified user based on the geographic positions included in each entry included in the table of entries.

14. A portable device comprising:
a processor;
a display device configured to display a map of a subject geographic area under control of the processor, the map being displayed in connection with a mapping application on the display device;
an input device configured to:
cause a marker-adding control to be presented to the user on the display device;
receive user input reflecting activation of the marker-adding control;
after receiving the user input reflecting activation of the presented marker-adding control, receive user input reflecting a touch at a point on the displayed map within the subject geographic area;
in response to receiving user input reflecting a touch at a point on the displayed map, cause a marker to be added to the displayed map at the point;
determine a geographic location that the point on the displayed map represents;
select the determined geographic location on behalf of the user;
access a particular set of one or more actions, wherein the set of one or more actions includes exercising a particular feature of the mapping application;
determine whether a user has taken an action among the set of one or more actions; and
in response to the determining, receive user input in connection with the displayed map selecting an additional geographic location within the subject geographic area as a second contest entry.

15. The portable device of claim 14 wherein the input device is a touch digitizer.

16. The portable device of claim 14 wherein the display device is further configured to display an indication of the selected location within the displayed map selected using the input device.

17. The portable device of claim 14 wherein the display device is further configured to display within the displayed map a plurality of indications each of a different location selected using the input device.

18. The portable device of claim 14 wherein the display device is further configured to display a border containing the subject geographic area.

19. The portable device of claim 14 wherein the display device is further configured to display a hint regarding where a location should be selected using the input device.

* * * * *